Oct. 4, 1927.

J. FLORENCE 1,644,118

PIPE TESTING PLUG

Filed Nov. 6, 1925

2 Sheets-Sheet 1

INVENTOR
John Florence
BY
ATTORNEY

Oct. 4, 1927.

J. FLORENCE 1,644,118

PIPE TESTING PLUG

Filed Nov. 6, 1925     2 Sheets-Sheet 2

INVENTOR
John Florence
BY
/ATTORNEY

Patented Oct. 4, 1927.

1,644,118

UNITED STATES PATENT OFFICE.

JOHN FLORENCE, OF INDIANAPOLIS, INDIANA.

PIPE-TESTING PLUG.

Application filed November 6, 1925. Serial No. 67,447.

My said invention relates to a pipe testing device such as is used for testing sewer pipes to determine whether they are tight and it is an object of the same to provide improved means for carrying out such tests in an expeditious manner.

A further object of the invention is to provide improved means in connection with a device of this character for blocking off one branch or one end of a pipe where another branch or another end is to be tested.

Figure 1:
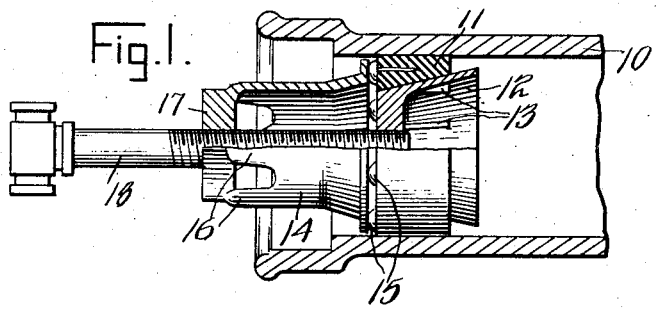
Figure 2:
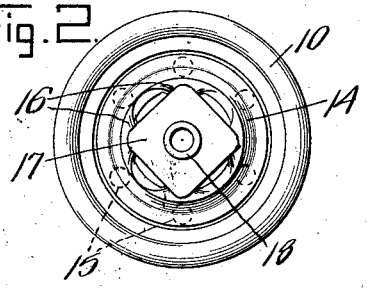
Figure 4:
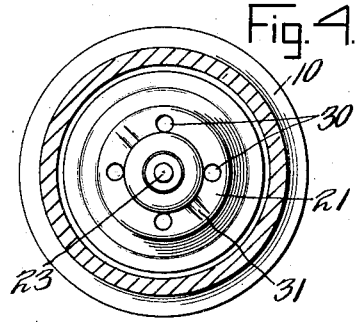
Figure 3:
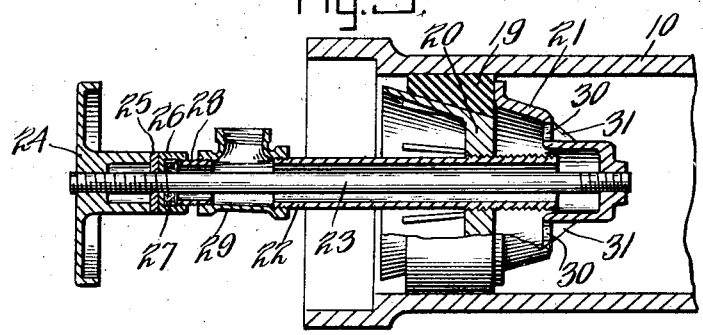
Figure 5:
Figure 6:
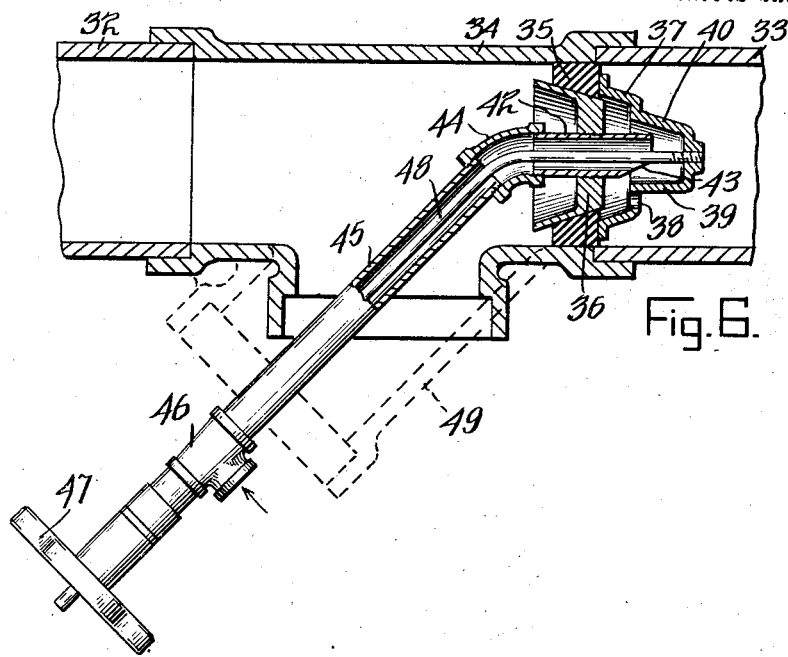
Figure 7:
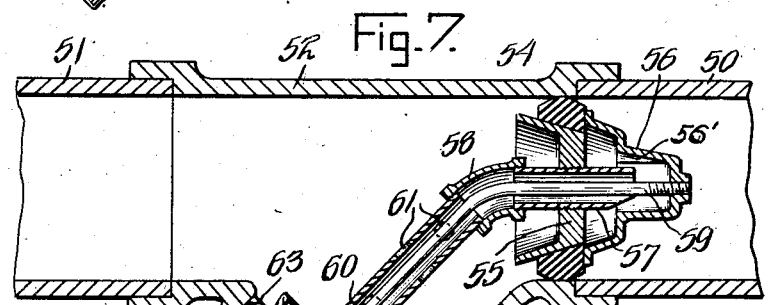
Figure 8:
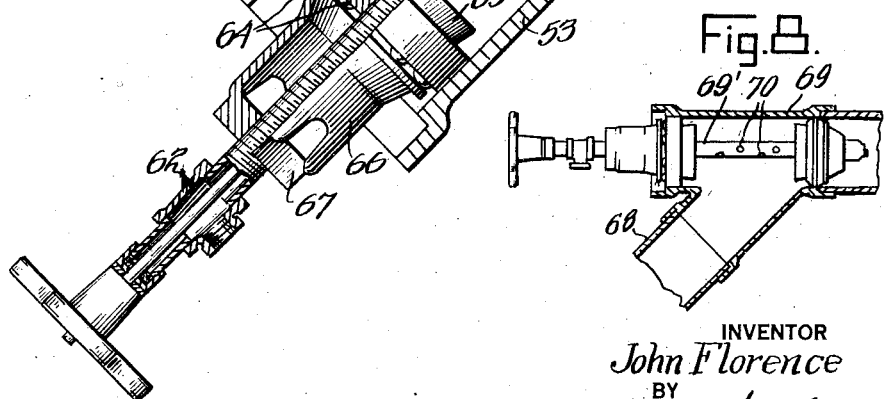

Referring to the accompanying drawings which are made a part hereof and on which similar reference characters indicate similar parts, Figure 1 is a longitudinal section of one form of my device in working position, Figure 2, an end elevation of Figure 1, viewed from the left, Figure 3, a longitudinal section of a modified form of the device, Figure 4, an end elevation of Figure 3, viewed from the right, Figure 5, a plan of a modified cap, Figure 6, a longitudinal section of another modification, Figure 7, a longitudinal section of another modification, and Figure 8, a longitudinal section of still another modified form.

In the drawings reference character 10 indicates a pipe to be tested and my device comprises a gasket or packing ring 11 having a cylindrical outer surface and a tapered or conical inner surface. A tapered expander 12 engages the tapered inner surface of the gasket and preferably this expander has an internally threaded head at the smaller end and a flared skirt extends toward the larger end. In the present form shown in Figure 1 strengthening ribs are indicated at 13. In this form also the bottom end of the skirt is directed toward the interior of the pipe so that the fluid pressure, either of air or water, tends to move the expander in a direction to press the gasket outward against the pipe and thus clamp the device in place in the pipe so as to hold it against longitudinal movement.

A cap 14 has a flange arranged to bear against the outer end of the gasket 11. In the form here shown the gasket is provided at this point with spaced metallic abutments 15 which may take the form of tacks or nails having their body portions embedded in the gasket and their heads protruding for engagement with the cap. The cap is open at the upper end and is provided with a series of openings between limbs 16 connecting the body of the cap to a top ring 17. A long threaded nipple or stem 18 has threaded engagement with the expander 12 and with the nut 17, said nipple or stem being here shown as having a Tee at the outer end by means of which the entire device may be manipulated and through which fluid may be admitted to the interior of the pipe after the device has been properly positioned in the manner illustrated in Fig. 1, thus testing the pipe to determine whether it has any leaks. It will be understood that the nut 17 can be turned by means of a wrench and will carry with it the cap 14, friction being diminished by the metal-to-metal contact between the nail heads 15 and the flange on the cap. The packing ring or washer with a cylindrical outer surface insures close engagement between the respective contacting surfaces of the washer, the pipe and the expander.

In the modification shown in Figures 3 and 4 the gasket 19 is arranged oppositely to that shown in Fig. 1 with a tapered expander 20 having its smaller end extending inwardly and a cap 21 having a flange bearing against the wide end of the gasket. The expander 20 is threaded on a long threaded nipple or stem 22 and a rod 23 extends through said nipple said rod having threaded engagement with the cap 21. The rod carries a hand wheel 24 at the outer end which hand wheel bears against a thrust washer 25 arranged about the rod between the end of the hand wheel and a packing nut 26 containing packing 27. The packing nut is connected by screw-threads to one end of a short nipple 28 which at the other end screws into a Tee 29 having threaded connection with the long nipple or stem 22 and being provided at one side with a port for the entrance of fluid which passes through the long nipple into the hollow interior of the cap 21 and out by way of ports 30 into the pipe 10. The ports extend axially through a shoulder in the cap and this shoulder is reenforced between the ports by ribs 31. The flange on the cap may be circular or as indicated in Fig. 5 it may be scalloped in a sort of star-shaped form.

In the form of the invention illustrated in Fig. 6 I have shown an arrangement for use in testing one of two pipes 32 and 33 connected by a T-joint 34. For such an operation the apparatus may be similar to that of Fig. 3 comprising a gasket 35, an expander 36, and a cap 37 having a port 38. The portion of the cap at 39 which is shown in Fig. 6 as being concentric with the pipe 32 and the rod 48 is in this instance inclined at one side as indicated at 40. A nipple 42 passes through the expander and is threaded thereto, said nipple having an incline or beveled end at 43. A 45° Ell 44 is connected to the rear end of the nipple 42 and said Ell is in turn connected to an extra long nipple or stem section 45 which extends to the outer side of the pipe to be tested and is there connected to a Tee 46 through which fluid is admitted to the extra long nipple or stem 45 and so to pipe 33. This device may be provided with a hand wheel 47 connected to the Tee in the manner illustrated in Fig. 3. A rod 48 carries the hand wheel, this rod being bent and connected at its inner end to the cap 37, the rod being sufficiently springy to permit turning of the cap to such an extent as may be necessary for seating the gasket firmly between the expander and the surface of the pipe to be tested. As indicated in dotted lines at 49 my device may be used equally well with a T-joint having a neck extending at an angle otherwise than a right-angle to the body of the joint.

In the modification shown in Fig. 7 I have illustrated means for testing the condition of that one of two pipes 50 and 51 connected by a joint 52 having a neck 53 extending at an incline with which said neck forms an acute angle. In such cases a plug is located at the entrance of pipe 50 which plug comprises a gasket 54 here shown as having an inner flaring surface and a narrow outer cylindrical surface beveled at opposite sides. An expander 55 bears against the inner surface of the gasket and a cap 56 having reinforcing rigs 56' serves to force the gasket lengthwise of the expander. The nipple 57 and 45° Ell 58 and the rod 59 may be as in the form of the invention shown in Fig. 6. The extra long threaded nipple or hollow stem 60, however, has ports indicated at 61 from which fluid may pass to the interior of the T-joint 52 and the pipe section 51, said fluid being admitted to the pipe by a Tee 62 in the manner above described. The neck of the joint 52 is closed by means comprising a gasket 63 which may or may not have nails 64 set into it. An expander 65 engages the inner surface of the gasket and forces it against the interior of said neck and a cap 66 here shown as being similar to that in Fig. 1 bears against the outer end of the gasket. A nut 67 has threaded connection with the extra long nipple 60 as has also the expander 65. It will be evident that when the parts are properly positioned the entrance to pipe 50 and neck 53 will be securely closed so that pressure may be admitted only to the pipe 51 for testing its condition. Fig. 8 illustrates means for testing a branch 68 leading off at an angle from a pipe section 69 the interior of which is readily accessible and which is here shown as extending in a straight line at an acute angle to the branch 68. In such case the parts may be substantially as in Fig. 7, the nipples 57 and 60 and Ell 58 being replaced by a single long nipple or hollow stem 69' having ports 70. It will be seen that when the device is positioned as shown in Fig. 8 the ends of the lateral or Y-branch 69 will be blocked off and air will be admitted only to the branch 68, this branch as here illustrated being attached to the neck of a joint whose body portion constitutes the Y-branch 69.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. In a pipe testing device adapted to be manipulated through an opening in said pipe having plugs near and far from said opening each comprising a packing ring and two compression members for expanding said packing ring, the combination of a long stem having an exterior portion next said opening and extending to both said plugs and having on its exterior portion rotatable means for compressing the near packing ring and an interior rod extending entirely through the stem for compressing the far packing ring, said rod having a rotatable actuating means separate from the first mentioned rotatable means and said stem conducting fluid into the space between the two plugs from the exterior portion, substantially as set forth.

2. A pipe testing plug comprising an annular packing gasket of elastic material, spaced metallic abutments on said gasket, an expanding plug for said gasket, and a tightener cap for bearing against said metallic abutments, substantially as set forth.

3. A testing plug for pipes comprising a threaded nipple having its ends inclined relative to each other, a tapered expanding plug adjustably mounted adjacent each end of the threaded nipple, a gasket disposed about each of said expanding plugs, a cap associated with each of said gaskets and adapted to bear against and compress the same, both of said caps being controlled from one end of the nipple, the controlling means for one of the caps comprising a bent rod supporting the cap at one end and having means at the other end of the nipple for drawing the rod through the same, substantially as set forth.

4. A testing device for a pipe having an opening, comprising a plug near to said opening and a plug relatively remote from said opening, each plug comprising a packing ring and a compression member for expanding the ring, a long hollow stem, part of which is located interiorly of said pipe and serves as a push element for the far plug and part of which is located exteriorly of the pipe and serves as a pull element for the near plug, a pull element for the far plug and an actuator for the last-named pull element mounted on the exterior part of the stem, an independent push element for the near plug mounted on the exterior of the stem, the stem also serving as a fluid conductor from the exterior of said pipe to the interior of said pipe, substantially as set forth.

In witness whereof, I have hereunto set my hand at Indianapolis, Indiana, this 22nd day of October, A. D. nineteen hundred and twenty-five.

JOHN FLORENCE.